Nov. 29, 1955     W. M. COX ET AL     2,724,861

TIRE CURING RIM

Filed Dec. 22, 1951

WILLIAM M. COX
& DAVID C. COX,
INVENTORS.

BY Eaton + Bell

ATTORNEYS.

United States Patent Office 2,724,861
Patented Nov. 29, 1955

2,724,861

TIRE CURING RIM

William M. Cox and David C. Cox, Charlotte, N. C., assignors to William M. Cox, Charlotte, N. C., doing business as Cox Tire Machinery Co.

Application December 22, 1951, Serial No. 262,916

3 Claims. (Cl. 18—18)

This invention relates to tire retreading apparatus and more especially to an improved curing rim which is positioned against the inner conventional air bag or curing tube within the tire casing and which air bag presses the tire casing against the conventional matrix or tread mold.

As is well known to those familiar with the art, some curing rims heretofore used have been made in the form of a unitary annulus and others have been made up in segmental or arcuate sections and, in some instances, the adjacent sections have been pivotally interconnected to facilitate collapsing the curing rim for storage purposes. The collapsible curing rims were formed of pivotally interconnected arcuate sections, wherein adjacent sections were made from a relatively thin material and were pivotally interconnected by means of projections on the inner face of each of the sections and which projections on each section projected beyond the radial cut or planiform outer edge of the corresponding section. These projections extending from adjacent sections have had a common hinge or pivot pin therethrough which was disposed in alinement with the radial plane of the proximate edges of adjacent sections.

This manner of pivotally interconnecting adjacent sections has been objectionable, in the instance of the sections being made from a relatively thin material, because the abutting proximate surfaces of adjacent sections would override one another under pressure of the air bag against the peripheral surfaces thereof and this would cause the hinge pin or pivot pin to shear and, consequently, the sections would be thrown inwardly towards the center of the curing rim formed from the sections and this would often result in injury of the operator.

Another reason why this type of pivotal connection at the juncture of adjacent sections has been objectionable is that the projecting portions through which the hinge pins extend have necessarily overlapped at the proximate edges of adjacent sections, requiring an operator of considerable skill to properly position these overlapping portions with respect to each other, and, also, these projections would easily be broken off of the corresponding sections in the event of the individual sections being dropped upon a hard surface such as the usual concrete floor in a tire recapping plant.

It is, therefore, the object of this invention to overcome such defects by providing each of the sections with a reenforcing arcuate rib on the inner face thereof conforming substantially to the arcuity of the corresponding section. Now, this rib terminates at opposite ends thereof flush with opposite ends of the corresponding section and may be of such thickness as to have a suitable hinge pin of a double-acting hinge positioned therein or, in the event of the rib being of insufficient thickness to accommodate the hinge pin or pivot pin, the opposite end portions of the rib may be thickened sufficiently to accommodate the corresponding hinge pins.

The outer ends of these rib portions or the thickened portions thereof, as the case may be, are rounded and the pivot pins at the juncture of adjacent sections are bridged by a hinge plate at either end thereof or at both ends as desired to thus pivotally interconnect adjacent sections. The rounded proximate edges of the ribs or the thickened portions thereof permit the adjacent sections to be pivoted inwardly towards the center of the annulus formed thereby and these ribs or the thickened portions thereof prevent the adjacent sections from overriding one another under the influence of the pressure exerted on the outer surfaces thereof by the usual air bag during the curing process.

It is preferable that each of the annuli or rings be formed from circularly arranged sections wherein each annulus is formed of a pair of three pivotally interconnected sections which define substantially a half of the rim and one half of the rim merely being abutted against the other half of the rim when the rim is in use. In other words, there would be no pivotal connection between the proximate portions of the halves of the rim to facilitate quickly assembling and disassembling the ring. This also permits the rims or rings to be stored in a minimum of space when they are not in use.

Some of the objects of the invention having been stated, other objects will appear as the description proceeds when taken in connection with the accompanying drawings, in which—

Figure 1:
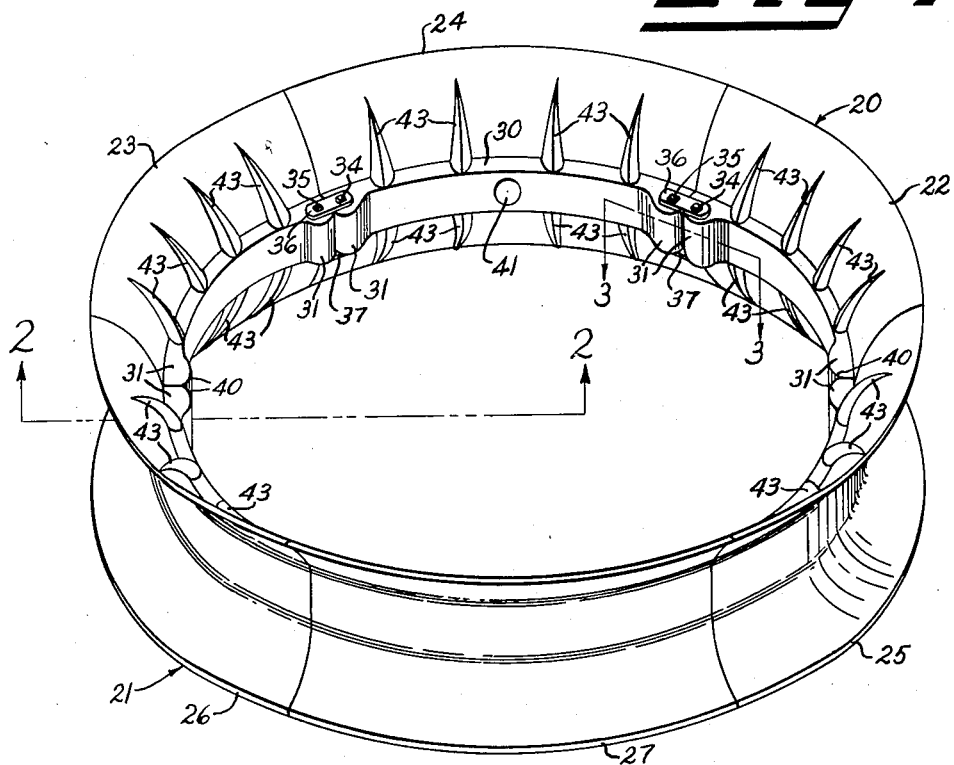
Figure 1 is an isometric view of the improved curing rim.

Referring more specifically to the drawings, the tire casing 10 is disposed within a conventional tire mold or matrix 11 of any desired construction and which may be assembled and heated in any desired manner, and, in accordance with conventional practice, the tire 10 is pressed against the matrix 11 by an air bag or tube 12 which may be of any desired form and shape and which has a conventional valve stem 13 extending inwardly therefrom.

The improved curing rim comprises substantially semi-circular halves broadly designated at 20 and 21, both of which are substantially identical and the half curing rim 20 comprises a plurality of arcuate sections, there being three sections shown in this instance and including outer sections 22 and 23 and an intermediate section 24, it being understood that a greater number of intermediate sections may be employed, if so desired. The second half 21 of the curing rim includes arcuate sections 25, 26, and 27 which are substantially the same as the corresponding sections 22, 23, and 24.

Each of the arcuate sections 22 to 27, inclusive, is preferably made from relatively thin material in order to minimize the weight thereof and has a centrally disposed arcuate reenforcing rib 30 on the inner surface thereof which conforms substantially to the arcuity of the inner surface of the corresponding arcuate section. Opposite ends of each of the ribs 30 terminate flush with the opposite ends of the corresponding arcuate section and are provided with thickened portions or projections 31 for accommodating the improved hinge means to be presently described.

It is evident that the rib 30 on each of the arcuate sections may be of sufficient thickness to accommodate the hinge means, the enlarged or thickened portions 31 being provided in the event of the corresponding rib being too thin to acommodate the hinge means.

Figure 3:
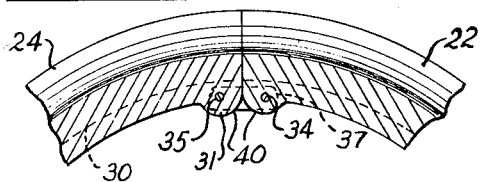
Figure 3 is an enlarged fragmentary sectional plan view taken along the line 3—3 in Figure 1 and illustrating the improved means of pivotally interconnecting adjacent sections in each of the halves of the curing rim.

Referring to Figure 3, it will be observed that the intermediate sections are connected hingedly or pivotally to the corresponding outside sections in a unique manner, the outside and intermediate sections 22 and 24, respectively, being shown in Figure 3. The enlarged or thickened portion 31 at one end of the outside section 22 has a hinge pin or pivot pin 34 therein and the proximate thickened portion 31 of the intermediate arcuate section 24 has a hinge pin or pivot pin 35 therein. These hinge pins or pivot pins 34 and 35 are preferably in the form of bolts.

The hinge pins or pivot pins 34 and 35 are bridged by plates or links 36 and 37 which slidably engage the opposite upper and lower surfaces of the thickened portions 31 at the juncture of the arcuate sections 22 and 24. It will be observed in Figure 3 that the proximate surfaces of the thickened portions 31 on the arcuate sections 22 and 24 are rounded as at 40 to facilitate swinging the arcuate sections 22 and 24 inwardly with respect to each other about the pivot pins 34 and 35.

Figure 2:
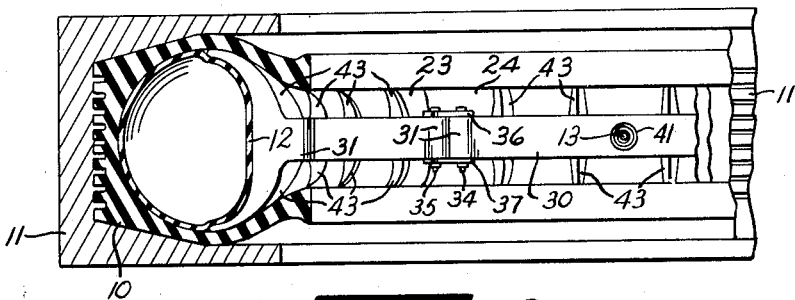
Figure 2 is an enlarged fragmentary vertical sectional view taken substantially along the line 2—2 in Figure 1 and also showing a portion of the usual matrix or tread mold and a tire and the air bag in association therewith.

The thickened portions 31 at the proximate edges or ends of adjacent sections also serve as abutments to prevent the arcuate sections from overriding one another when they are positioned as shown in Figure 2 and when the air bag 12 is filled with air sufficiently to exert pressure on the outer surfaces of the arcuate sections.

One of the sections, preferably one of the intermediate sections, such as the arcuate section 24, has a passageway 41 therethrough to allow passage therethrough of the valve stem 13 of the bag 12.

Now, it will be noted in Figure 1 that the end sections at the juncture of the first half and second half of the curing rim are not pivotally interconnected but merely abut one another and the thickness of the thickened portion 31 at the juncture of the end sections 22 and 25 and 23 and 26 is such that uniform pressure of the tube or bag 12 around the entire periphery of the assembled curing rim will tend to move the sections 22 and 25 and 23 and 26 independently and radially toward the axis of the curing rim, causing the proximate faces of the projections 31 at the proximate ends of the corresponding end sections 22 and 25 and 23 and 26 to be held in proper mutually-keyed relation to each other in substantially the manner in which the keystone, at the apex of an arch in the building industry, serves to hold the arch together.

It is thus seen that the halves 20 and 21 of the curing rim may be easily and quickly positioned within the tire casing as shown in Figure 2 to facilitate repairing the tire casing 10 and, after the tube or air bag 12 has been deflated, the end sections 22 and 23 and 25 and 26 on the halves 20 and 21 of the curing rim may be folded inwardly over the intermediate sections 24 and 27 and thus quickly remove from the tire preparatory to repairing another tire or, in which condition, each of the halves 20 and 21 may be stored in a minimum of space.

In order to further reenforce the arcuate sections, each of the arcuate sections may be provided with a plurality of laterally extending ribs 43 which extend outwardly from opposite surfaces of the rib 30 on each of the arcuate sections 22 to 27, inclusive, and which are preferably tapered in order to provide a smooth juncture between the same and the outer portion of the corresponding arcuate section as is clearly shown in Figures 1 and 2.

In the drawings and specification, there has been set forth a preferred embodiment of the invention and although specific terms are employed, they are used in a generic and descriptive sense only and not for purposes of limitation, the scope of the invention being defined in the claims.

We claim:

1. A tire curing rim comprising a plurality of circularly arranged rigid, one-piece, arcuate sections, each being concavo-convex in cross-section and having a rib formed integral with and extending throughout the length of the inner surface thereof adjacent the axis of the rim, a thickened portion formed integral with each end of the rib of each arcuate section, the ends of said ribs being flush with the corresponding ends of the sections, said thickened portions being rounded at their outer edges nearest the axis of the rim, a pair of hinge pins in the thickened portions on the proximal ends of at least two immediately adjacent arcuate sections, and at least one link hinge plate penetrated by said pair of hinge pins for pivotally interconnecting the proximal ends of said two adjacent sections.

2. A curing rim comprising a plurality of arcuate sections forming a first substantially semi-circular half and a second substantially semi-circular half, each half including two substantially diametrically opposite end sections and at least one intermediate section, a thickened arcuate rib portion extending throughout the length of the inner face of each section relative to the axis of the rim, projections at opposite ends of each section, said thickened rib ends being flush with the corresponding ends of the arcuate sections, said projections being rounded at their outer ends nearest the axis of the rim, means pivotally connecting the ends of the intermediate sections to the corresponding ends of the end sections comprising a hinge pin slidably penetrating each of the projections at the proximate ends of the adjacent intermediate and end sections and extending in parallel relation to the axis of the rim, said hinge pins projecting beyond opposite surfaces of the projections, and a pair of link hinge plates connecting the corresponding ends of the adjacent hinge pins at opposite ends thereof for pivotally interconnecting the proximate ends of the intermediate sections and the end sections.

3. In a tire curing rim having circularly arranged arcuate sections, each provided with an inner surface adjacent the axis of the rim, a thickened rib portion extending throughout the length of the inner surface of each arcuate section, the outer ends of said thickened rib portions being flush with the corresponding ends of the sections, a projection extending from the thickened rib portion at each end of each section, said projections being rounded at their outer edges nearest the axis of the rim, a pair of hinge pins in the thickened portions on the proximal ends of at least two immediately adjacent arcuate sections, and at least one link hinge plate penetrated by said pair of hinge pins for pivotally interconnecting the proximate ends of said two adjacent sections.

References Cited in the file of this patent

UNITED STATES PATENTS

| | | |
|---|---|---|
| 1,589,105 | Calusinski | June 15, 1926 |
| 1,689,664 | Covell | Oct. 30, 1928 |
| 1,938,437 | O'Brien | Dec. 5, 1933 |
| 2,561,573 | Hovlid et al. | July 24, 1951 |